United States Patent [19]

Paik et al.

[11] Patent Number: 5,243,624
[45] Date of Patent: Sep. 7, 1993

[54] METHOD AND APPARATUS FOR UPDATING COEFFICIENTS IN A COMPLEX ADAPTIVE EQUALIZER

[75] Inventors: Woo H. Paik, Encinitas; Scott A. Lery, Leucadia; Allen Wu, San Diego, all of Calif.

[73] Assignee: General Instrument Corporation, Hatboro, Pa.

[21] Appl. No.: 733,791

[22] Filed: Jul. 26, 1991

[51] Int. Cl.[5] .................. H03H 7/30; G06F 15/31
[52] U.S. Cl. .................. 375/14; 364/724.19; 364/724.20
[58] Field of Search ............... 375/12, 14, 15; 333/18; 364/724.19, 724.20

[56] References Cited

U.S. PATENT DOCUMENTS

| | | |
|---|---|---|
| 4,435,823 | 3/1984 | Davis et al. |
| 4,718,073 | 1/1988 | Takaoka .................. 375/14 |
| 4,771,438 | 9/1988 | Nash .................. 375/39 |
| 4,872,184 | 10/1989 | Yamaguchi et al. .................. 375/14 |
| 5,068,873 | 11/1991 | Murakami .................. 375/14 |
| 5,097,482 | 3/1992 | Serizawa et al. .................. 375/14 |
| 5,119,401 | 6/1992 | Tsujimoto .................. 375/14 |

OTHER PUBLICATIONS

B. V. Rao, et al., "A New Design for Digital Adaptive Filters," *International Journal of Electronics*, vol. 55, No. 3, Sep. 1983, pp. 473-477.

B. Baccetti, et al., "Full Digital Adaptive Equalization in 64-QAM Radio Systems," *IEEE Journal on Selected Areas in Communications*, vol. SAC-5, No. 3, Apr. 1987, pp. 466-475.

Shahid U. H. Qureshi, "Adaptive Equalization," *Proceedings of the IEEE*, vol. 73, No. 9, Sep. 1985, pp. 1349-1387.

*Primary Examiner*—Curtis Kuntz
*Assistant Examiner*—Vijay Shankar
*Attorney, Agent, or Firm*—Barry R. Lipsitz

[57] ABSTRACT

Convergence of a complex adaptive equalizer used in digital communications is substantially improved by updating all coefficients of the equalizer during each filter clock cycle. Complex signal data is passed through a plurality of successive delay stages to provide N sets of delayed complex signal data. The product of each set and a complex error signal is obtained. Each product is concurrently updated with previous product data for the set to provide N sets of updated complex coefficients for selective input to equalizer filters. In an illustrated embodiment, the updated coefficients are truncated and their gain is adjusted prior to input to the filters. The updated coefficients can be multiplexed to provide a clocked stream of coefficient sets for input to the equalizer filters. A VLSI implementation of the equalizer is also disclosed.

18 Claims, 7 Drawing Sheets

METHOD AND APPARATUS FOR UPDATING COEFFICIENTS IN A COMPLEX ADAPTIVE EQUALIZER

BACKGROUND OF THE INVENTION

The present invention relates to digital communications, and more particularly to an improved adaptive equalizer for reducing intersymbol interference in a received signal A method and apparatus are provided for adjusting filter coefficients in a manner that significantly reduces the convergence time of the equalizer.

Digital data, for example digitized video for use in broadcasting high definition television (HDTV) signals, can be transmitted over terrestrial very high frequency (VHF) or ultra high frequency (UHF) analog channels for communication to end users. Analog channels deliver corrupted and transformed versions of their input waveforms. Corruption of the waveform, usually statistical, may be additive and/or multiplicative, because of possible background thermal noise, impulse noise, and fades. Transformations performed by the channel are frequency translation, nonlinear or harmonic distortion, and time dispersion.

In order to communicate digital data via an analog channel, the data is modulated using, for example, a form of pulse amplitude modulation (PAM). Typically, quadrature amplitude modulation (QAM) is used to increase the amount of data that can be transmitted within an available channel bandwidth. QAM is a form of PAM in which a plurality, such as sixteen or thirty-two, bits of information are transmitted together in a pattern referred to as a "constellation".

In pulse amplitude modulation, each signal is a pulse whose amplitude level is determined by a transmitted symbol. In 16-QAM, symbol amplitudes of $-3$, $-1$, 1 and 3 in each quadrature channel are typically used. In bandwidth efficient digital communication systems, the effect of each symbol transmitted over a time-dispersive channel extends beyond the time interval used to represent that symbol. The distortion caused by the resulting overlap of received symbols is called intersymbol interference (ISI). This distortion has been one of the major obstacles to reliable high speed data transmission over low background noise channels of limited bandwidth. A device known as an "equalizer" is used to deal with the ISI problem.

In order to reduce the intersymbol interference introduced by a communication channel, rather precise equalization is required Furthermore, the channel characteristics are typically not known beforehand. Thus, it is common to design and use a compromise (or a statistical) equalizer that compensates for the average of the range of expected channel amplitude and delay characteristics. A least mean square (LMS) error adaptive filtering scheme has been in common use as an adaptive equalization algorithm for over 20 years. This algorithm is described in B. Widrow and M. E. Hoff, Jr., "Adaptive Switching Circuits" in IRE Wescon Conv. Rec., Part 4, pp. 96-104, August 1960. The use of the LMS algorithm in an adaptive equalizer to reduce intersymbol interference is discussed in S. U. H. Qureshi, "Adaptive Equalization", *Proc. IEEE,* Vol. 73, No. 9, pp. 1349-1387, September 1987.

In an LMS equalizer, the equalizer filter coefficients are chosen to minimize the mean square error, i.e., the sum of squares of all the ISI terms plus the noise power at the output of the equalizer. Therefore, the LMS equalizer maximizes the signal-to-distortion ratio at its output within the constraints of the equalizer time span and the delay through the equalizer. Before regular data transmission begins, automatic synthesis of the LMS equalizer for unknown channels may be carried out during a training period. This generally involves the iterative solution of a set of simultaneous equations. During the training period, a known signal is transmitted and a synchronized version of the signal is generated in the receiver to acquire information about the channel characteristics. The training signal may consist of periodic isolated pulses or a continuous sequence with a broad, uniform spectrum such as a widely known maximum length shift register or pseudo-noise sequence.

An important aspect of equalizer performance is its convergence, which is generally measured by the amount of time in symbol periods required for the error variance in the equalizer to settle at a minimum level, which is ideally zero. In order to obtain the most efficient operation for a data receiver, the equalizer convergence time must be minimized.

After any initial training period, the coefficients of an adaptive equalizer may be continually adjusted in a decision directed manner. In this mode, the error signal is derived from the final receiver estimate (not necessarily correct) of the transmitted sequence. In normal operation, the receiver decisions are correct with high probability, so that the error estimates are correct often enough to allow the adaptive equalizer to maintain precise equalization. Moreover, a decision directed adaptive equalizer can track slow variations in the channel characteristics or linear perturbations in the receiver front end, such as slow jitter in the sampler phase.

The larger the step size, the faster the equalizer tracking capability. However, a compromise must be made between fast tracking and the excess mean square error (MSE) of the equalizer. The excess MSE is that part of the error power in excess of the minimum attainable MSE (with tap gains frozen at their optimum settings). This excess MSE, caused by tap gains wandering around the optimum settings, is directly proportional to the number of equalizer coefficients, the step size, and the channel noise power.

Many transmission systems employ modulation schemes that are constructed with complex signal sets. In other words, the signals are viewed as vectors in the complex plane, with the real axis called the inphase (I) channel and the imaginary axis called the quadrature (Q) channel. Consequently, when these signals are subjected to channel distortion and receiver impairments, cross talk between the I and Q channels occurs, requiring a complex adaptive equalizer. In this case, the equalizer's coefficients will be complex valued. If, as noted above, the channel distortion is unknown by the receiver, then the coefficients must be adjusted after the system has been in operation to cancel the channel distortion. The term "adaptive" in a complex adaptive equalizer signifies the ongoing adjustment of the coefficients.

Prior art adaptive equalizers, including complex adaptive equalizers, have suffered from a relatively long convergence time of the LMS algorithm. Alternate algorithms, such as the recursive least squares (RLS) algorithm have been developed in order to overcome this disadvantage, and the RLS algorithm does indeed converge faster than LMS. However, RLS is more complex to implement than LMS and there are also numerical stability problems associated with the RLS algorithm. Therefore, prior art designs have tolerated the longer convergence time of the LMS implementation in order to avoid the disadvantages of the RLS scheme.

Even though the LMS algorithm is less complex to implement than other algorithms such as RLS, substantial hardware is still required to implement the algorithm in systems where floating point signal processors are not fast enough. It would therefore be advantageous to provide an implementation of the LMS algorithm that minimizes hardware without sacrificing system performance. It would be further advantageous to provide an LMS adaptive equalizer having improved convergence performance (i.e., faster convergence time) without undue added complexity. It would be still further advantageous to provide such an adaptive equalizer that is easily implemented in an integrated circuit, such as in a very large scale integration (VLSI) device.

The present invention provides an adaptive equalizer having the above-noted advantages.

SUMMARY OF THE INVENTION

In accordance with the present invention, a method is provided for updating coefficients in a complex adaptive equalizer. Complex signal data is passed through a plurality of successive delay stages to provide N sets of delayed complex signal data. The product of each set and a complex error signal is obtained, and each product is concurrently updated with previous product data for the set to provide N sets of updated complex coefficients for selective input to equalizer filters. By concurrently updating the products derived from each successive delay stage and the error signal, the convergence time of the equalizer is substantially reduced.

In a preferred embodiment, the complex coefficients of each updated set are truncated, and the gain thereof is adjusted to provide coefficients at a suitable level for filtering by the equalizer filters. The sets of adjusted, truncated coefficients are multiplexed to provide a clocked stream of coefficient sets for input to the equalizer filters.

The present invention also provides apparatus for updating coefficients in an adaptive equalizer. A plurality of successive delay stages are coupled to provide a plurality of sets of delayed signal data from an input signal. Means are provided for multiplying each set of delayed signal data by an error signal to provide a plurality of products. Means concurrently update each product with previous product data to provide a plurality of sets of updated coefficients. The updated coefficient sets are selectively input to an equalizer filter stage.

In an illustrated embodiment, the update means comprise a plurality of parallel processing paths, each for updating one of said products. Each parallel processing path is coupled between the multiplying means and means for selectively inputting the updated coefficient sets to the equalizer filter stage. Each of the parallel processing paths comprises an adder having a first input for receiving a product from the multiplying means, a second input and an output. A delay circuit is coupled to receive product data from the adder output and to couple delayed product data to the second adder input. Means are provided for coupling the adder output to the selective inputting means.

The parallel processing paths can further comprise means, coupled between the adder output and the selective inputting means, for truncating the updated coefficients. Means can also be provided between the adder output and the selective inputting means, for adjusting the gain of the updated coefficients. The sets of updated coefficients can be multiplexed to provide a clocked stream of coefficient sets for input to the equalizer filter stage.

In an integrated circuit implementation, the multiplying means can comprise a plurality of multiplying stages corresponding to the plurality of delay stages. The updating means can similarly comprise a plurality of updating stages corresponding to the plurality of delay and multiplying stages. In this manner, sets of corresponding delay, multiplying and updating stages form parallel processing paths for the sets of delayed signal data. The parallel paths are then implemented as slices in an integrated circuit.

DETAILED DESCRIPTION OF THE INVENTION

Figure 1:
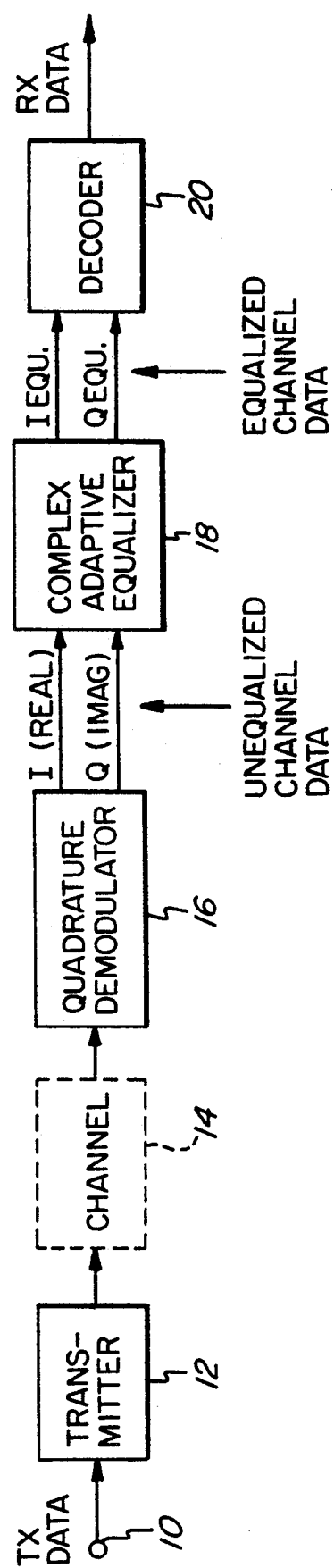
FIG. 1 is a block diagram of a typical transmission system illustrating the location of a complex adaptive equalizer.

In the transmission system illustrated in FIG. 1, a signal to be transmitted is input to a transmitter 12 via an input terminal 10. The signal contains digital data, modulated on an analog carrier using, for example, well known QAM techniques. The QAM modulated data is a complex signal that includes real components I and imaginary components Q. Transmitter 12 is a conventional device, such as a well known VHF or UHF transmitter.

The transmitted signal is communicated via a channel 14, such as a terrestrial VHF or UHF communications channel, to a receiver that contains a quadrature demodulator 16 for the QAM data. Quadrature demodulator 16 is a conventional component that extracts the I and Q components of the received data for input to a complex adaptive equalizer 18. Complex adaptive equalizers, per se, are well known in the art. The present invention provides an improved equalizer with a reduced convergence time using the LMS algorithm. As illustrated in FIG. 1, the received channel data input to complex adaptive equalizer 18 is unequalized, and suffers from the intersymbol interference caused by the amplitude and/or delay distortion introduced by communication channel 14. Complex adaptive equalizer 18 compensates for this distortion, and outputs equalized channel data $I_{equ}$ and $Q_{equ}$. The equalized channel data is input to a conventional decoder 20 to retrieve the transmitted information data, which can comprise, for example, HDTV video information.

Figure 2:
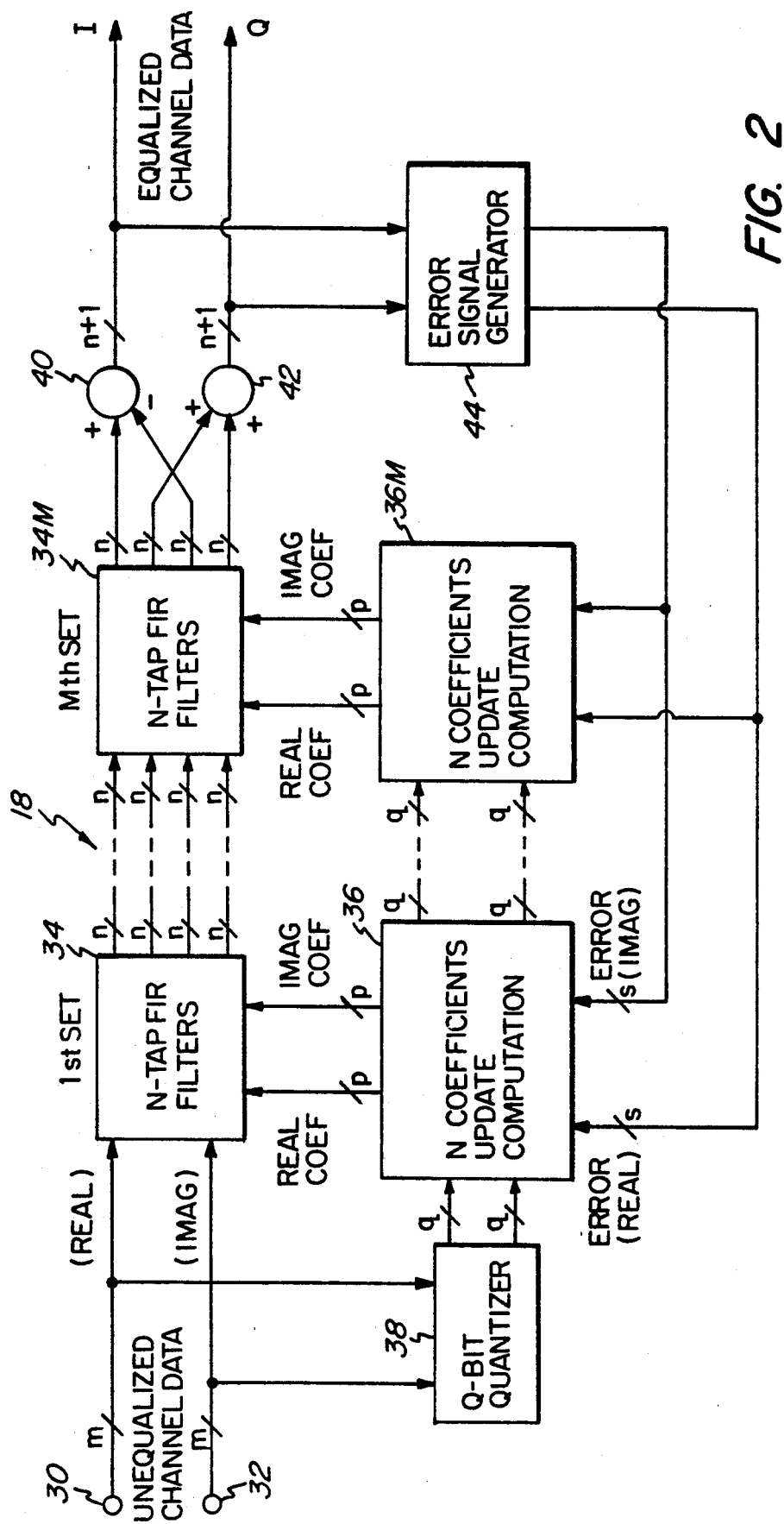
FIG. 2 is a block diagram of an $M \times N$ tap complex adaptive equalizer using cascaded components.

FIG. 2 illustrates an embodiment of complex adaptive equalizer 18 in greater detail. Unequalized channel data from the quadrature demodulator is input at terminals 30, 32 respectively. Terminal 30 receives the real (I) demodulated channel data and terminal 32 receives the imaginary (Q) demodulated channel data. Each of the demodulated I and Q signals comprise m-bit bytes that are input both to a first stage 34 of N-tap finite impulse response (FIR) filters and a q-bit quantizer 38. Quantizer 38 quantizes each m-bit byte into a smaller byte for input to an N-coefficients update computation circuit 36.

As shown in FIG. 2, equalizer 18 comprises M sets or stages, each containing an N-tap FIR filter circuit and an N-coefficients update computation circuit. After the last (Mth) stage, the outputs from the last N-tap FIR filter circuit are combined in adders 40, 42 to provide the real equalized channel data I and the imaginary equalized channel data Q. The equalized I and Q data is also input to an error signal generator 44, which outputs an error signal that is fed back to each of the update computation circuits 36 to $36_M$. In a preferred embodiment, error signal generator 44 comprises a programmable read only memory (PROM) that outputs a precalculated stored error value in response to the Q and I data that is used to address the PROM. The stored error values have been previously computed using the well known LMS algorithm.

Figure 3:
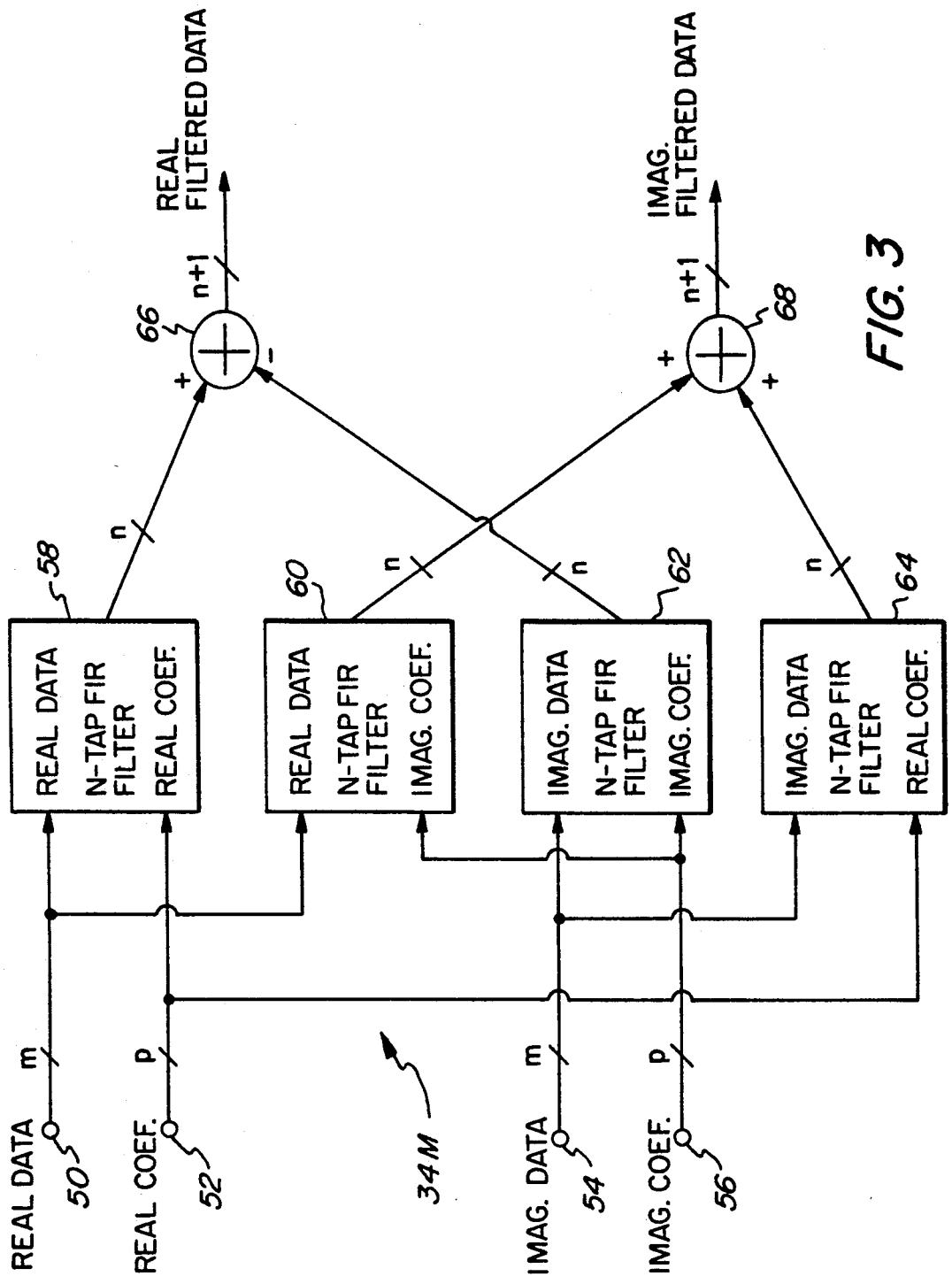
FIG. 3 is a block diagram of an N-tap complex finite impulse response (FIR) filter that can be used in the equalizer of FIG. 2.

The last stage N-tap FIR filter circuit $34_M$ is illustrated in greater detail in FIG. 3. As shown, four FIR filter sets 58, 60, 62, and 64 are provided for receiving the real and imaginary channel data from the previous stage. Real data, in the form of m-bit bytes, is received at terminal 50 and input to each of N-tap FIR filters 58, 60. Imaginary data in the form of m-bit bytes is received at terminal 54, for input to N-tap FIR filters 62, 64.

Coefficients generated by the update computation circuits 36 to $36_M$ (FIG. 2) are input to terminals 52 and 56 of the N-tap FIR filter circuit. In particular, terminal 52 receives the real coefficients for input to filters 58 and 64, and terminal 56 receives the imaginary coefficients for input to filters 60 and 62. The outputs of filters 58, 62 are subtracted in an adder 66 to provide the real filter data. The outputs of filters 60, 64 are added in an adder 68 to provide the imaginary filtered data. The operation of such an N-tap FIR filter circuit is described in greater detail in the article to S. U. H. Qureshi referred to above, e.g., at pp. 1355-1356 thereof.

Figure 4:
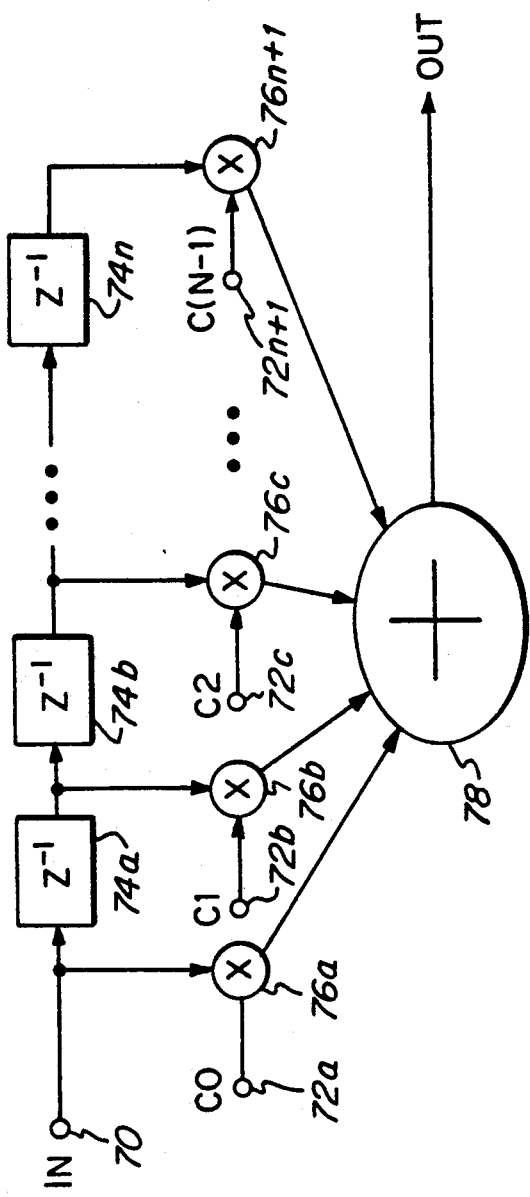
FIG. 4 is a block diagram illustrating a theoretical FIR filter structure.

FIG. 4 illustrates a theoretical structure of an FIR filter, and is often used to describe such filters. However, the structure of FIG. 4 is seldom used in practice, because of the complexities involved in making an N input adder, such as adder 78, and the necessity of providing N delay element outputs, which would require N output pins on an integrated circuit implementation. In the theoretical structure illustrated, data (whether real or imaginary) is input at a terminal 70 to a plurality of successive delay elements 74a, 74b, ... 74n. Coefficient data is input to each of a plurality of terminals 72a, 72b, 72c, ... 72n+1 for application to an associated multiplier 76a, 76b, 76c, ... 76n+1. The multipliers obtain the product of the coefficients with the input data, as successively delayed by delay stages 74a to 74n. The products are summed together in an adder 78 for output to an appropriate adder 66 or 68, illustrated in FIG. 3. Thus, the outputs of the N delay elements 74a to 74n, which form a vector of past data, are used in accordance with the LMS algorithm to update the FIR coefficients.

Figure 5:
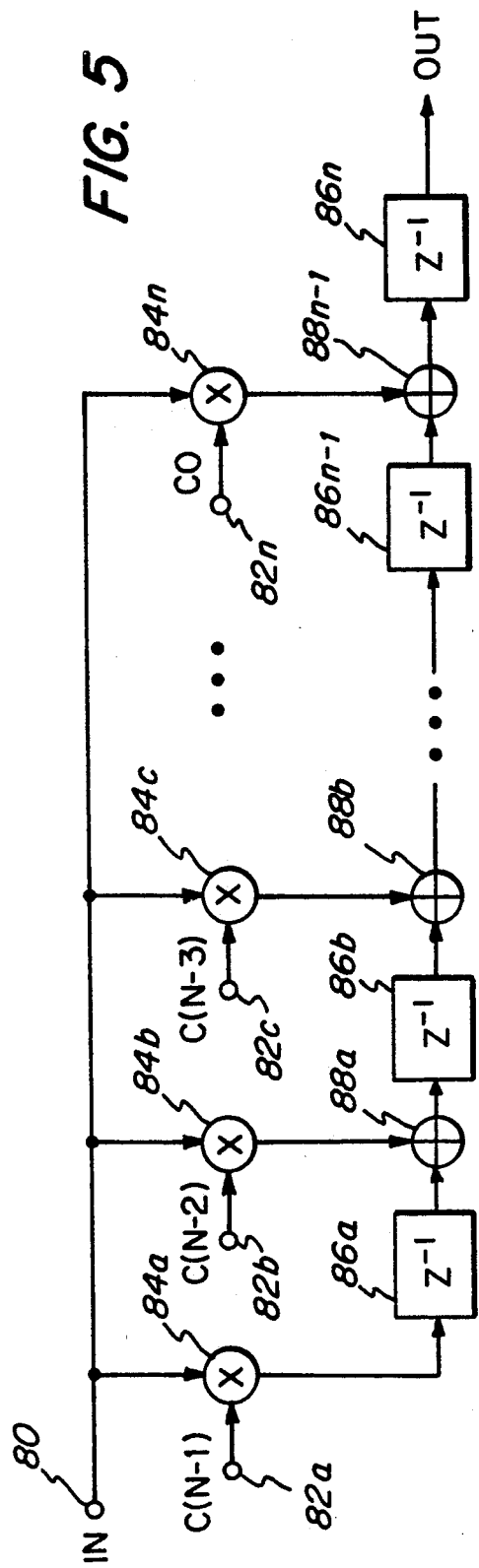
FIG. 5 is a block diagram illustrating a practical FIR filter structure.

In practice, an FIR filter structure as illustrated in FIG. 5 is actually used. Data (real or imaginary) is input at a terminal 80, for application to each of a plurality of multipliers 84a, 84b, 84c, ... 84n. Coefficients are input to each of the multipliers at respective terminals 82a, 82b, 82c, ... 82n. The products of the input data and the coefficients are input to a respective delay circuit 86a, 86b, ... 86n via adders 88a, 88b, ... 88n−1, as appropriate. The output of delay circuit 86n comprises the filtered data for input to adder 66 or adder 68 of FIG. 3. The operation of the FIR filter is well known in the art, and described, for example, at pages 1357-1359 of the S. U. H. Qureshi article referred to above.

Generally, only one coefficient of an FIR filter can be changed for each filter clock cycle. Thus, it takes N filter clock cycles to make one complete adjustment of an N-tap filter. When M, N-tap filters and coefficients update computation circuits are cascaded as illustrated in FIG. 2, it still takes only N filter clock cycles to update all M×N taps. In prior art designs, since only one coefficient of the FIR filter is changed each filter clock cycle, all of the other coefficients were maintained at their prior state until the next update cycle for that coefficient arrived. This resulted in a rather long convergence time for an adaptive equalizer utilizing such filters.

The present invention reduces the convergence time of the equalizer by updating all N coefficients each filter cycle, even though the filters can accept only one coefficient update per cycle. Since the coefficients are continuously updated, their convergence time is reduced.

The invention implements the LMS algorithm in quantized form to update the coefficients. In unquantized form the algorithm is given by:

$$C_{n+1} = C_n + \Delta E_n X^*_n$$

where $C_n$ is the complex vector of coefficients, $X_n$ is the complex vector of delayed data, * means complex conjugate, E is the complex error signal, and $\Delta$ is a scale factor. In quantized form the algorithm is:

$$Q_m[C_{n+1}] = Q_m[C_n] + \delta Q_s[E_n] Q_q[X^*_n]$$

where $Q_i$ is an i-bit quantizer, $\delta$ is a scale factor, and the final quantized coefficient is given by $Q_p\{Q_m[C_{n+1}]\}$.

Figure 6:
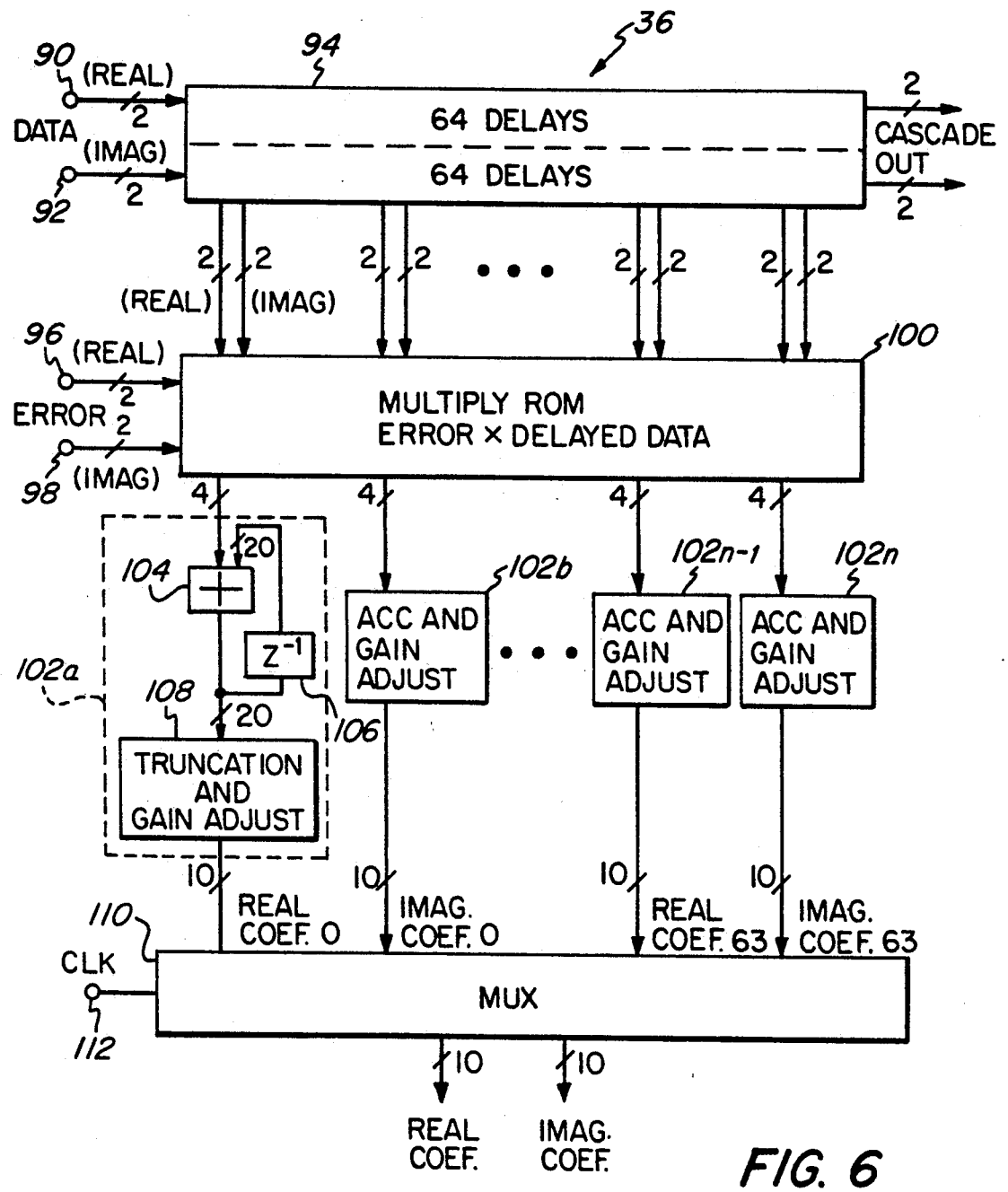
FIG. 6 is a block diagram of a coefficient update computation circuit in accordance with the present invention.

FIG. 6 illustrates a 64 tap complex coefficient update computation circuit 36 in accordance with the present invention. Two-bit quantized unequalized complex data (real and imaginary) is input at terminals 90 (real) and 92 (imaginary). Similarly, the two-bit quantized real and imaginary components of a complex error signal are input at terminals 96, 98 respectively. Sixty-four cascaded delay stages 94 receive the real and imaginary data for input, along with the error signals, as addresses to a multiply read-only memory (ROM) that obtains the product of each data component with each error component for input to an accumulator and gain adjust circuit associated with the particular delay stage from which the data was output. Circuit 102a is an example of one of the accumulator and gain adjust circuits As can be seen in FIG. 6, each accumulator and gain adjust circuit 102a to 102n includes a 20-bit accumulator 104 that sums the product from multiply ROM 100 with a delayed product output from delay circuit 106. Delay circuit 106 outputs 20-bit delayed coefficients. The 20-bit accumulator is used to update the coefficients. The LMS scale factor, $\Delta$, is inherent in the width of the accumulator. After accumulation, the coefficients are truncated and gain adjusted in a conventional truncation and gain adjust circuit 108. The gain adjustment adjusts the magnitude of the coefficients. A multiplexer 110 receives all of the coefficients from each stage, multiplexes them together, and selects one set for output each clock cycle. A clock input 112 is provided to input the clock signal to multiplexer 110.

The gain adjustment performed on the truncated coefficients provides a means for improving performance in noise. The values of the less significant coefficients can be limited to minimize random fluctuations about their optimum values. This minimizes their contribution to the excess error variance, which is an inherent problem with the LMS algorithm.

Figure 7:
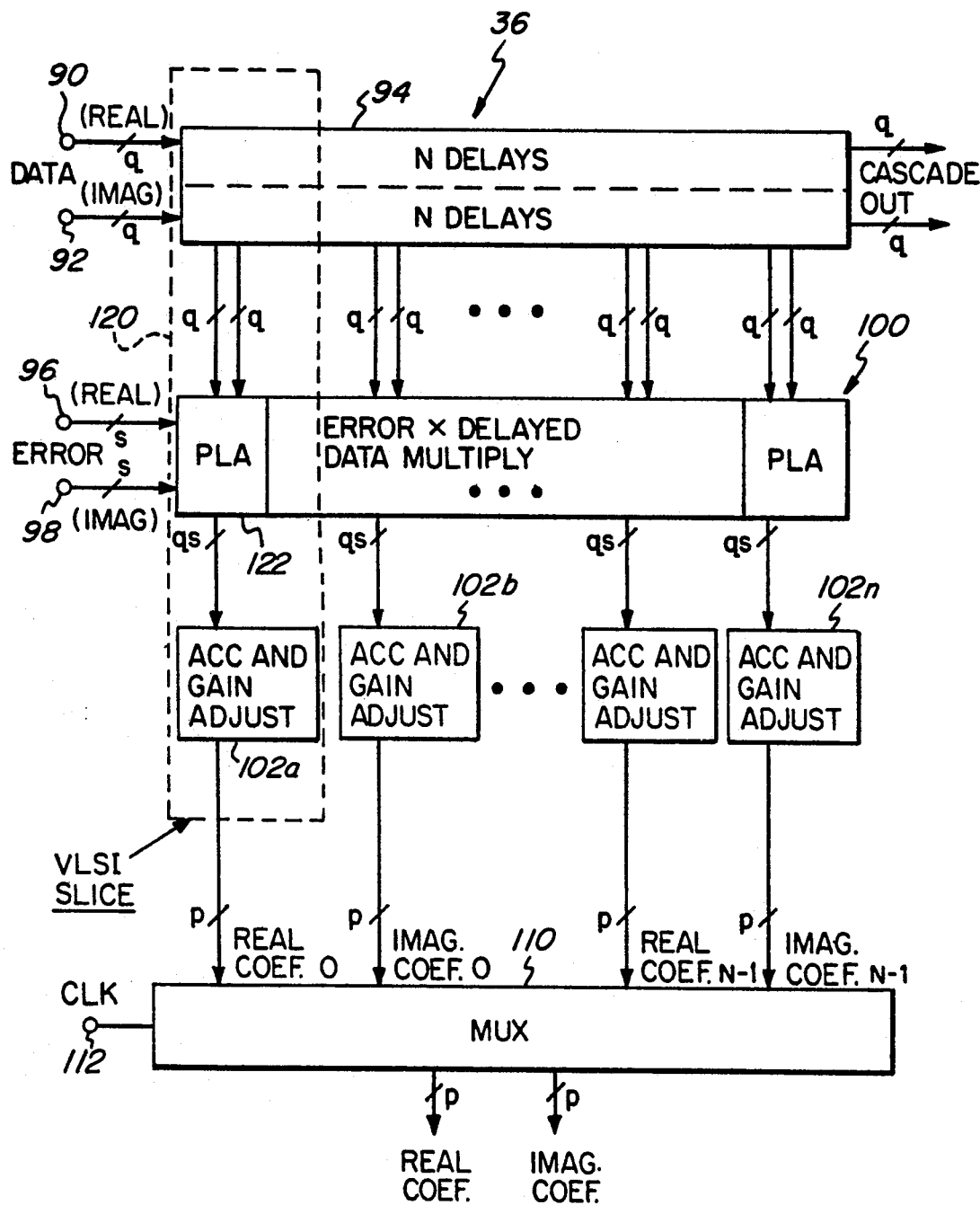
FIG. 7 is a block diagram of a VLSI implementation of the coefficient update computation circuit of FIG. 6.

FIG. 7 illustrates an arrangement of the coefficient update computation circuit of FIG. 6 that lends itself to a VLSI implementation. As shown in FIG. 7, the multiplying means can comprise a plurality of programmable logic array (PLA) multiplying stages 122 corresponding to the plurality of delay stages provided in delay section 94. Each delay stage and PLA multiplication stage corresponds to one of the accumulator and gain adjust stages 102a to 102n, to provide a parallel processing path 120. Each parallel processing path 120 can provide a separate VLSI slice for fabrication in an integrated circuit.

Since the coefficients update computation circuitry of the present invention updates all of the N coefficients in parallel every filter clock cycle, instead of just one coefficient per cycle, the convergence time of the equalizer is not significantly degraded by the practical implementation of the LMS algorithm. Indeed, the convergence time of the invention is on the order of 1/N times the convergence time of prior art schemes that only adjust one coefficient every cycle.

Figure 8:
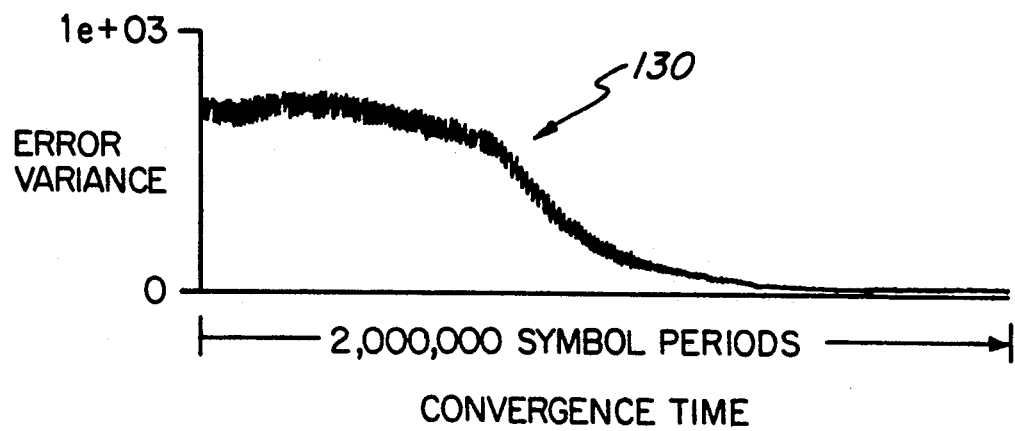
FIG. 8 is a response curve illustrating the convergence time of a prior art complex adaptive equalizer.
Figure 9:
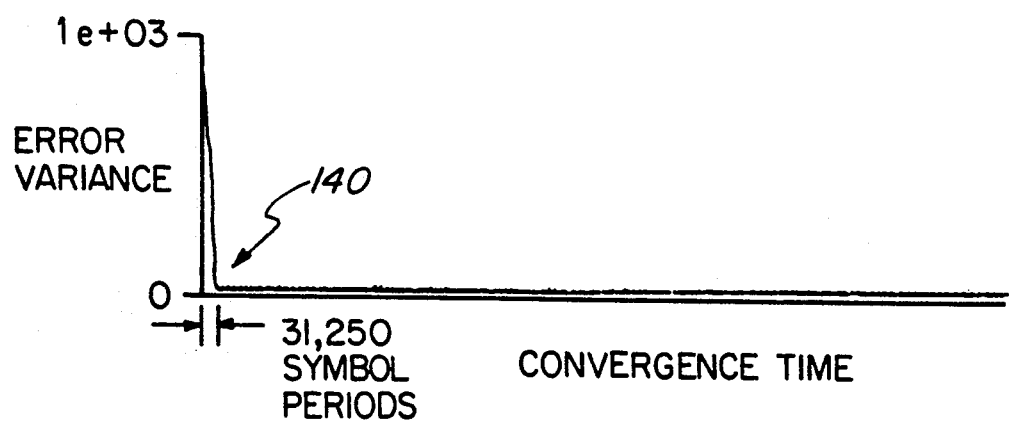
FIG. 9 is a response curve illustrating the convergence time of a complex adaptive equalizer in accordance with the present invention.

FIGS. 8 and 9 illustrate the results of two simulations, comparing the convergence times of two equalizers. The prior art equalizer performance illustrated by FIG. 8 employs a coefficient update scheme that adjusts only one coefficient every filter clock cycle. FIG. 9 illustrates the performance of an equalizer in accordance with the present invention, wherein all N coefficients are updated in parallel every filter clock cycle. The simulations used the quantized version of the LMS algorithm, and a 256 complex taps, fractional spaced equalizer. Both simulations used four, 64 coefficients update computation blocks as illustrated in FIG. 6, but the coefficient adjustment for the equalizer pertaining to FIG. 8 was limited to one coefficient per filter clock cycle instead of processing all coefficients in parallel. The transmission system was 16-QAM at a symbol rate of 5 MHz, with additive white Gaussian noise (AWGN) and multipath distortion. The carrier-to-noise ratio (C/N) was 30 dB, and the multipath had a reflected ray delayed by 5 microseconds, which was down $-10$ dB from the direct ray.

The comparison criterion illustrated is the error variance (EV) versus convergence time in symbol periods, where the error is the difference between the received signal point and the nearest 16-QAM constellation point. As can be seen by comparing the response 130 of FIG. 8 with the response 140 of FIG. 9, a factor of 64 decrease in convergence time (31,250/2,000,000 symbol periods) is obtained by adjusting all the coefficients every filter clock cycle, when compared to adjusting one coefficient every cycle. Thus, the parallel processing of the present invention provides a substantial improvement in performance over the prior art.

It will now be appreciated that the present invention provides an improved equalizer, and in particular a complex adaptive equalizer, wherein convergence time is substantially reduced by updating all of the coefficients in parallel during each filter cycle. Although the invention has been described in connection with a preferred embodiment thereof, those skilled in the art will appreciate that numerous adaptations and modifications may be made thereto without departing from the spirit and scope of the invention, as set forth in the following claims.

What is claimed is:

1. A method for updating coefficients in an adaptive equalizer having at least one equalizer filter stage that receives said coefficients during successive filter clock cycles, comprising the steps of:

passing signal data through a plurality of successive delay stages to provide N sets of delayed signal data;

obtaining the product of each set and an error signal derived from data output from said adaptive equalizer;

concurrently updating each product with pervious product data for the set to provide N sets of coefficient updates during each of said filter clock cycles; and selectively outputting only one set of said coefficient updates per filter clock cycle to said equalizer filter stage.

2. A method in accordance with claim 1 wherein said equalizer is a complex adaptive equalizer and said signal data, error signal and coefficients include real and imaginary complex components.

3. A method in accordance with claim 1 comprising the further step of:

truncating the coefficients of each of coefficient updates set.

4. A method in accordance with claim 3 comprising the further step of:

adjusting the gain of the truncated coefficients.

5. A method in accordance with claim 4 comprising the further step of:

multiplexing the sets of adjusted and/or truncated coefficients to provide a clocked stream of coefficient sets for input to said equalizer filters.

6. A method in accordance with claim 5 wherein said equalizer is a complex adaptive equalizer and said signal data, error signal and coefficients include real and imaginary complex components 7. A method in accordance with claim 1 comprising the further step of:

multiplexing said sets of updated coefficients to provide a clocked stream of coefficient sets for input to said equalizer filters.

8. Apparatus for updating coefficients in an adaptive equalizer having at least one equalizer filter stage that receives said coefficients during successive filter clock cycles, comprising:

a plurality of successive delay stages coupled to provide a plurality of sets of delayed signal data from an input signal;

means for multiplying each set of delayed signal data by an error signal derived from data output from said adaptive equalizer, to provide a plurality of products;

means for concurrently updating each product with previous product data to provide a plurality of sets of said updated coefficients during each of said filter clock cycles; and means for selectively outputting only one of said updated coefficient sets to said equalizer filter stage per filter clock cycle.

9. Apparatus in accordance with claim 8 wherein said update means comprise a plurality of parallel processing paths, each path coupled between said multiplying means and said inputting means for updating one of said products 10. Apparatus in accordance with claim 9 wherein each of said paths comprises an adder having a first input for receiving a product from said multiplying means, a second input, and an output;

a delay circuit coupled to receive product data from said output and to couple delayed product data to said second input; and means for coupling said output to said selective inputting means.

11. Apparatus in accordance with claim 10 wherein said paths further comprise:

means, coupled between said adder output and said selective inputting means, for truncating said updated coefficients.

12. Apparatus in accordance with claim 11 wherein said paths further comprise:

means, coupled between said adder output and said selective inputting means, for adjusting the gain of said updated coefficients.

13. Apparatus in accordance with claim 8 further comprising:

means for truncating said updated coefficients.

14. Apparatus in accordance with claim 8 further comprising:

means for adjusting the gain of said updated coefficients.

15. Apparatus in accordance with claim 8 wherein said inputting means comprise means for multiplexing the sets of updated coefficients to provide a clocked stream of coefficient sets for input to said equalizer filter stage.

16. Apparatus in accordance with claim 8 wherein:

said multiplying means comprise a plurality of multiplying stages corresponding to said plurality of delay stages; and said updating means comprise a plurality of updating stages corresponding to said plurality of delay and multiplying stages;

wherein sets of said corresponding delay, multiplying and updating stages form parallel processing paths for the sets of delayed signal data.

17. Apparatus in accordance with claim 16 wherein said parallel paths are implemented as slices in an integrated circuit.

18. Apparatus in accordance with claim 8 wherein said equalizer is a complex adaptive equalizer and said signal data, error signal and coefficients include real and imaginary complex components.

* * * * *

UNITED STATES PATENT AND TRADEMARK OFFICE
CERTIFICATE OF CORRECTION

PATENT NO. : 5,243,624
DATED : September 7, 1993
INVENTOR(S) : Paik, et al.

It is certified that error appears in the above-identified patent and that said Letters Patent is hereby corrected as shown below:

Claim 3 should read:

-- 3. A method in accordance with claim 1 comprising the further step of:
truncating the coefficients of each set of coefficient updates. --

Signed and Sealed this

Twenty-ninth Day of March, 1994

Attest:

BRUCE LEHMAN

Attesting Officer     Commissioner of Patents and Trademarks